US010552111B2

(12) United States Patent
Cha et al.

(10) Patent No.: US 10,552,111 B2
(45) Date of Patent: Feb. 4, 2020

(54) CONTROL DEVICE

(71) Applicant: LG ELECTRONICS INC., Seoul (KR)

(72) Inventors: Byungchang Cha, Seoul (KR); Sangjoon Park, Seoul (KR); Heeyoung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/142,945

(22) Filed: Sep. 26, 2018

(65) Prior Publication Data

US 2019/0235818 A1 Aug. 1, 2019

(30) Foreign Application Priority Data

Jan. 31, 2018 (KR) .................. 10-2018-0012351

(51) Int. Cl.
| G06F 3/147 | (2006.01) |
| G09G 3/32 | (2016.01) |
| G06T 7/70 | (2017.01) |
| H04N 5/232 | (2006.01) |

(52) U.S. Cl.
CPC ............. *G06F 3/147* (2013.01); *G06T 7/70* (2017.01); *G09G 3/32* (2013.01); *G09G 2300/026* (2013.01); *G09G 2320/0626* (2013.01); *G09G 2320/0666* (2013.01); *G09G 2320/0686* (2013.01); *G09G 2354/00* (2013.01); *G09G 2360/145* (2013.01); *G09G 2370/06* (2013.01); *G09G 2370/16* (2013.01); *G09G 2380/06* (2013.01); *H04N 5/232* (2013.01)

(58) Field of Classification Search
None
See application file for complete search history.

(56) References Cited

U.S. PATENT DOCUMENTS

| 5,504,504 A * | 4/1996 | Markandey ........ G02B 26/0841 345/214 |
| 2004/0263497 A1 | 12/2004 | Leroux et al. |
| 2005/0088424 A1 | 4/2005 | Morrison et al. |
| 2016/0019834 A1 | 1/2016 | Hall |

FOREIGN PATENT DOCUMENTS

| KR | 10-2004-0010160 A | 1/2004 |
| KR | 10-0586790 B1 | 6/2006 |
| KR | 10-1482912 B1 | 1/2015 |

* cited by examiner

*Primary Examiner* — Yingchun He
(74) *Attorney, Agent, or Firm* — Birch, Stewart, Kolasch & Birch, LLP

(57) ABSTRACT

A control device for controlling a display device including a plurality of light source assemblies arranged in rows and columns. The control device includes a camera configured to obtain at least one image of the display device including at least two activated light source assemblies in a first row and at least two activated light source assemblies in a first column; a controller configured to obtain a first intersecting point of a first straight line connecting the at least two light source assemblies of the first row and a second straight line connecting the at least two light source assemblies of the first column; and a display unit configured to display the first intersecting point. Further, the at least one image of the display device is an image in which at least one light source assembly positioned in the first row and the first column is deactivated.

20 Claims, 21 Drawing Sheets

FIG. 6

CONTROL DEVICE

CROSS-REFERENCE TO RELATED APPLICATIONS

Pursuant to 35 U.S.C. § 119(a), this application claims the benefit of an earlier filing date and priority to Korean Application No. 10-2018-0012351 filed in the Republic of Korea on Jan. 31, 2018, the contents of which are incorporated by reference herein in its entirety.

BACKGROUND OF THE INVENTION

Field of the Invention

The present disclosure relates to a control device.

Discussion of the Related Art

Digital signage is a communication tool that enables advertisers to utilize marketing, advertisement, training, etc. and to induce customer experience. The digital signage is a digital image device that provides not only typical broadcast contents in public places, such as airports, hotels and hospitals, but also advertisement contents from advertisers. The digital signage includes a processor and a memory embedded therein, and can also freely move and clearly represent various contents. Thus, the digital signage can be used for various purposes such as promotional use, customer service, and medium media in department stores, subways, bus stops, etc. In addition, the digital signage does not necessarily provide only advertisement contents and can provide various contents having purposes other than advertisement.

The digital signage generally uses a plurality of light emitting diodes (LEDs). Because the LEDs have a long life span and high emission efficiency, they have replaced related art fluorescent lights and incandescent bulbs. Further, because the LEDs are small size in comparison with related art light sources, they are becoming more popular as a lighting device.

SUMMARY OF THE INVENTION

An object of the present disclosure is to provide a control device obtaining location information of a light source assembly of a display device.

Another object of the present disclosure is to provide a control device obtaining location information of a light source assembly positioned at a vertex of a display device.

Another object of the present disclosure is to provide a control device obtaining location information of a light source assembly using a light source assembly positioned at an outermost side even if a light source assembly positioned at a vertex of a display device is not activated.

Another object of the present disclosure is to provide a control device adjusting a luminance or a color temperature of a light source assembly included in a display device.

Advantageous Effects

The present disclosure can obtain location information of a light source assembly of a display device such as location information of a light source assembly positioned at a vertex of a display device.

The present disclosure can also obtain location information of a light source assembly using a light source assembly positioned at an outermost side even if a light source assembly positioned at a vertex of a display device is not activated. Further, the present disclosure can adjust a luminance or a color temperature of a light source assembly included in a display device.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

An object of the present disclosure is to provide a control device obtaining location information of a light source assembly of a display device.

Another object of the present disclosure is to provide a control device obtaining location information of a light source assembly positioned at a vertex of a display device.

Another object of the present disclosure is to provide a control device obtaining location information of a light source assembly using a light source assembly positioned at an outermost side even if a light source assembly positioned at a vertex of a display device is not activated.

Another object of the present disclosure is to provide a control device adjusting a luminance or a color temperature of a light source assembly included in a display device.

In one aspect of the present disclosure, there is provided a control device for controlling a display device including a plurality of light source assemblies forming a plurality of rows and a plurality of columns, the control device including a camera configured to obtain an image of the display device in which light source assemblies of a first row are activated and an image of the display device in which light source assemblies of a first column are activated, a controller configured to obtain an intersecting point of a first straight line connecting the light source assemblies of the first row and a second straight line connecting the light source assemblies of the first column, and a display unit configured to display the intersecting point.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

FIGS. 5 to 21 illustrate examples of a control operation using a control device.

DETAILED DESCRIPTION OF THE EMBODIMENTS

Figure 1:
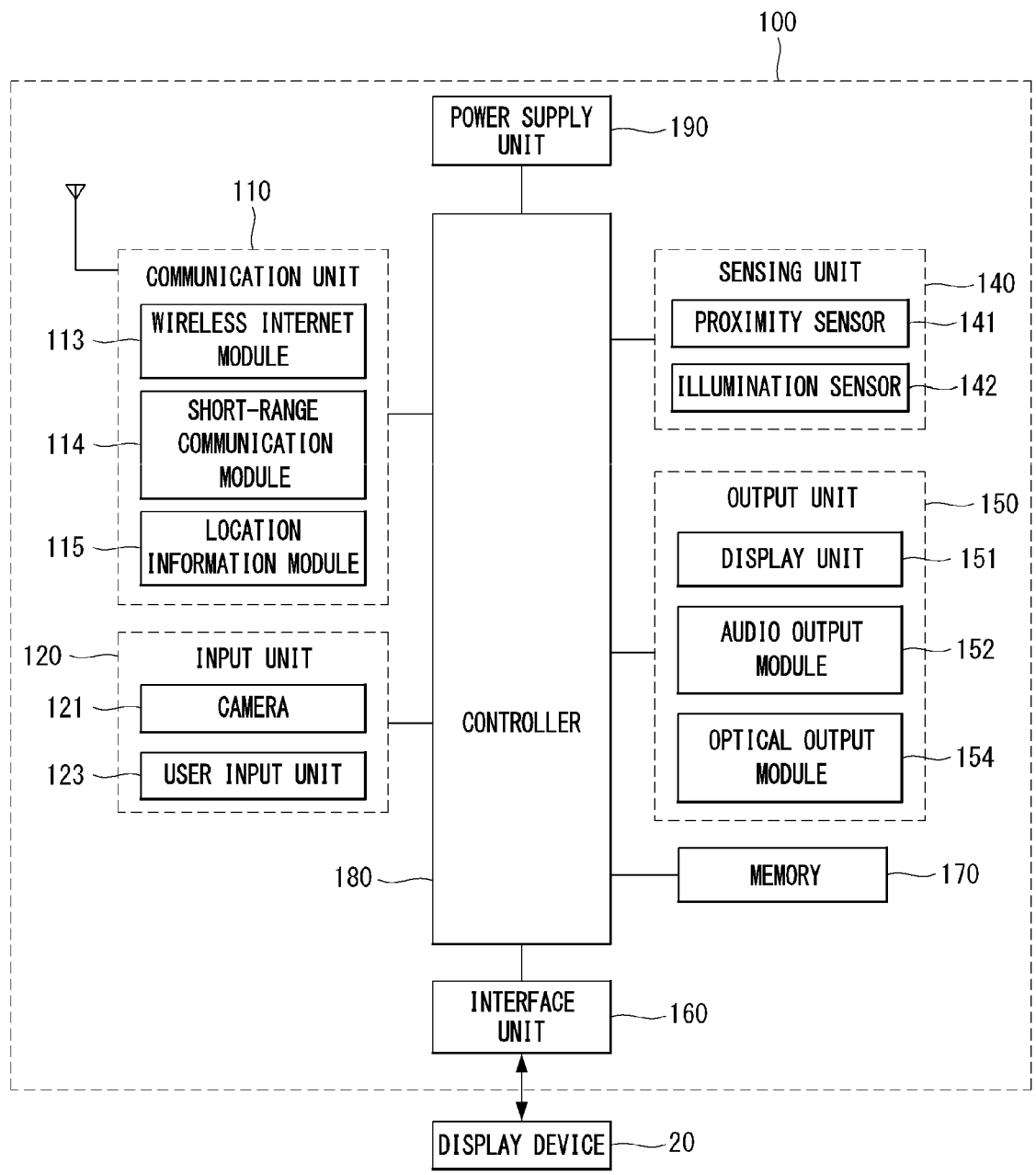
FIG. 1 illustrates configuration of a control device.

Reference will now be made in detail embodiments of the disclosure examples of which are illustrated in the accompanying drawings. Since the present disclosure may be modified in various ways and may have various forms, specific embodiments are illustrated in the drawings and are described in detail in the present specification. However, it should be understood that the present disclosure are not limited to specific disclosed embodiments, but include all modifications, equivalents and substitutes included within the spirit and technical scope of the present disclosure.

The terms 'first', 'second', etc. may be used to describe various components, but the components are not limited by such terms. The terms are used only for the purpose of distinguishing one component from other components. For example, a first component may be designated as a second component without departing from the scope of the present disclosure. In the same manner, the second component may be designated as the first component.

The term "and/or" encompasses both combinations of the plurality of related items disclosed and any item from among the plurality of related items disclosed. When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present disclosure. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present disclosure pertains. The terms defined in a generally used dictionary must be understood to have meanings identical to those used in the context of a related art, and are not to be construed to have ideal or excessively formal meanings unless they are obviously specified in the present application.

The following embodiments of the present disclosure are provided to those skilled in the art in order to describe the present disclosure more completely. Accordingly, shapes and sizes of elements shown in the drawings may be exaggerated for clarity.

In the following description, "+X-axis" direction may be referred to as a right direction, and "−X-axis" direction may be referred to as a left direction. "+Y-axis" direction may be referred to as an upward direction, and "−Y-axis" direction may be referred to as a downward direction. "+Z-axis" direction may be referred to as a front or forward direction, and "−Z-axis" direction may be referred to as a rear or rearward direction.

Referring to FIG. 1, a control device 100 includes a communication unit 110, an input unit 120, a sensing unit 140, an output unit 150, an interface unit 160, a memory 170, a controller 180, a power supply unit 190, and the like. Implementing all of the components illustrated in FIG. 1 is not a requirement for the control device 100, and that more or fewer components may be alternatively implemented for the control device 100.

The communication unit 110 may include one or more modules which enable communications such as communications between the control device 100 and a communication system, communications between the control device 100 and another control device, or communications between the control device 100 and an external server. Further, the communication unit 110 may include one or more modules which connect the control device 100 to one or more networks.

The communication unit 110 may include at least one of a wireless Internet module 113, a short-range communication module 114, and a location information module 115. The input unit 120 may include a camera 121 or an audio input unit which inputs a video signal or an image signal, a user input unit 123 (for example, a touch key, a push key, a mechanical key, etc.) which receives information from a user, and the like. Audio data or image data obtained by the input unit 120 may be analyzed and processed as user control commands.

The user input unit 123 can generate input data according to a command applied from the user and may include a key pad, a dome switch, a touch pad, a jog wheel, a jog switch, and the like.

The sensing unit 140 may include one or more sensors configured to sense at least one of information about a surrounding environment of the control device 100 and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a fingerprint scan sensor, a ultrasonic sensor, an optical sensor (e.g., camera 121), a microphone, a battery gauge, an environment sensor (e.g., a barometer, a hygrometer, a thermometer, a radiation detection sensor, a thermal sensor, and a gas sensor, etc.), and a chemical sensor (e.g., an electronic nose, a health care sensor, a biometric sensor, etc.). The control device 100 according to embodiments of the disclosure may be configured to utilize combinations of information obtained from two or more sensors of the sensing unit 140.

The output unit 150 can output various types of information, such as audio, video, and tactile outputs. The output unit 150 may include at least one of a display unit 151, an audio output module 152, and an optical output module 154. The display unit 151 may have an inter-layered structure or an integrated structure with a touch sensor in order to implement a touch screen. The touch screen may function as the user input unit 123 which provides an input interface between the control device 100 and the user, and at the same time provide an output interface between the control device 100 and the user.

The display unit 151 may include a display module that displays (or outputs) information processed by the control device 100. For example, the display unit 151 can display execution screen information of an application program driven at the control device 100 or user interface (UI) information and graphic user interface (GUI) information in response to the execution screen information.

In addition, the display unit 151 may be implemented using a plurality of display units according to an implementation type of the control device 100. In this instance, the plurality of display units of the control device 100 may be spaced from each other or integrated with each other on one surface, or may be respectively disposed on different surfaces.

The display unit 151 may include a touch sensor which senses a touch input of the display unit 151, in order to receive a control command by a touching manner. When a touch is input to the display unit 151, the touch sensor can sense the touch, and the controller 180 can generate a control command corresponding to the touch. The content which is input by the touching manner may be a text or a numerical value, or a menu item which can be indicated or designated in various modes.

The touch sensor may be a film having a touch pattern and be disposed between a window and a display module positioned in the rear of the window, or may be a metal wire which is patterned directly on a rear surface of the window. Alternatively, the touch sensor may be integrally formed with the display module. For example, the touch sensor may be disposed on a substrate of the display module or disposed within the display module.

Further, the display unit 151 may form a touch screen together with the touch sensor as described above. In this instance, the touch screen may serve as the user input unit 123. The display module may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may further include a window through which a screen of the display module can be viewed from the outside, and the window can protect the display module. The window may be mounted on a case and form a front surface of the control device 100 together with the case. The window may also be implemented as a window assembly which is a combination of a plurality of members.

In addition, the interface unit 160 serves as an interface with various types of external devices that are coupled to the control device 100. The interface unit 160 may include at least one of wired or wireless headset ports, external charger ports, wired or wireless data ports, memory card ports, ports for connecting a device having an identification module, audio input/output (I/O) ports, video I/O ports, and earphone ports. The control device 100 can perform proper control functions associated with an external device connected to the interface unit 160 in response to the external device being connected to the interface unit 160. The interface unit 160 may be electrically or physically connected to a display device 20.

The memory 170 stores data to support various functions of the control device 100. For instance, the memory 170 can store application programs (or applications) executed in the control device 100, data or instructions for operations of the control device 100, and the like. At least some of the application programs may be downloaded from an external server via wireless communication. At least some of the application programs may be installed within the control device 100 at time of manufacturing or shipping so as to perform basic functions of the control device 100. The application programs may be stored in the memory 170, installed in the control device 100, and executed by the controller 180 to perform an operation (or function) of the control device 100.

The controller 180 typically functions to control overall operation of the control device 100, in addition to the operations associated with the application programs. The controller 180 can provide or process information or functions suitable for a user by processing signals, data, information and the like, which are input or output by the components depicted in FIG. 1, or executing the application programs stored in the memory 170.

The controller 180 can control at least some of the components illustrated in FIG. 1, in order to execute the application programs that have been stored in the memory 170. Furthermore, the controller 180 can combine and operate at least two of the components included in the control device 100, in order to execute the application programs.

The power supply unit 190 can receive external electric power and internal electric power under the control of the controller 180 and supply the power to each of the components included in the control device 100. The power supply unit 190 may include a battery, and the battery may be an embedded battery or a detachable battery.

At least some of the above components may be combined with one another and operate, in order to implement an operation, a control, or a control method of a control device 100 according to various embodiments described below. Further, an operation, a control, or a control method of the control device 100 according to various embodiments may be implemented by an execution of at least one application program stored in the memory 170.

Figure 2:
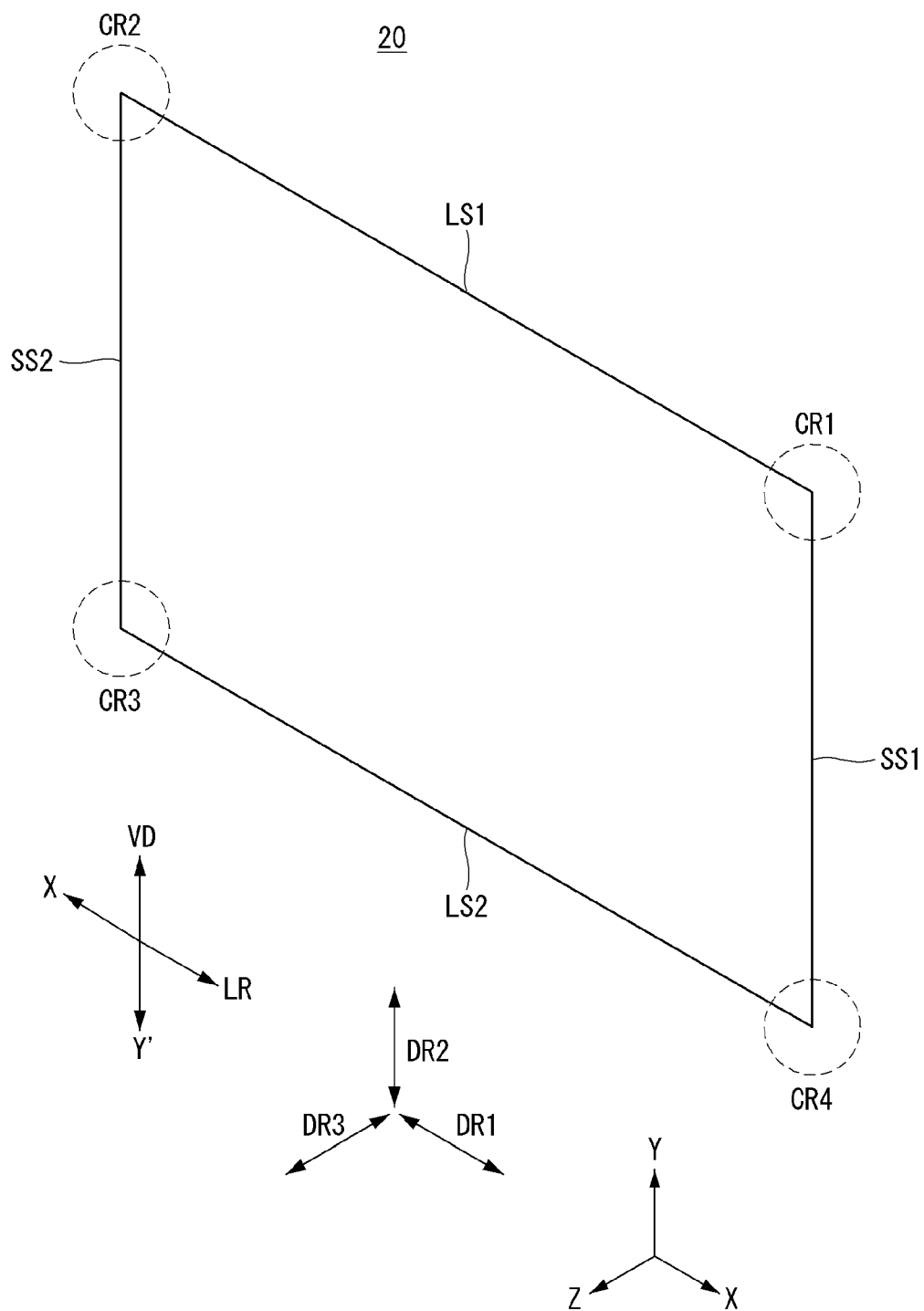
FIGS. 2 and 3 illustrate an implementation example of a display device.

Referring to FIG. 2, the display device 20 may include a first long side LS1, a second long side LS2 opposite the first long side LS1, a first short side SS1 adjacent to the first long side LS1 and the second long side LS2, and a second short side SS2 opposite the first short side SS1. In embodiments disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the disclosure describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 20, and a second direction DR2 may be a direction parallel to the short sides SS1 and SS2 of the display device 20. Further, a third direction DR3 may be a direction vertical to the first direction DR1 and/or the second direction DR2.

In addition, a side or a surface, on which the display device 20 displays an image, may be referred to as a forward direction, a front side, or a front surface. When the display device 20 displays an image, a side or a surface, at which the image cannot be viewed, may be referred to as a backward or rearward direction, a back or rear side, or a back or rear surface. When the display device 20 is observed at the forward direction, the front side, or the front surface, the first long side LS1 may be referred to as an upward direction, an upper side, or an upper surface. In the same manner as the first long side LS1, the second long side LS2 may be referred to as a downward direction, a lower side, or a lower surface. Further, the first short side SS1 may be referred to as a right direction, a right side, or a right surface, and the second short side SS2 may be referred to as a left direction, a left side, or a left surface.

Further, the first long side LS1, the second long side LS2, the first short side SS1, and the second short side SS2 may be referred to as edges of the display device 20. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In addition, a direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

Figure 3:
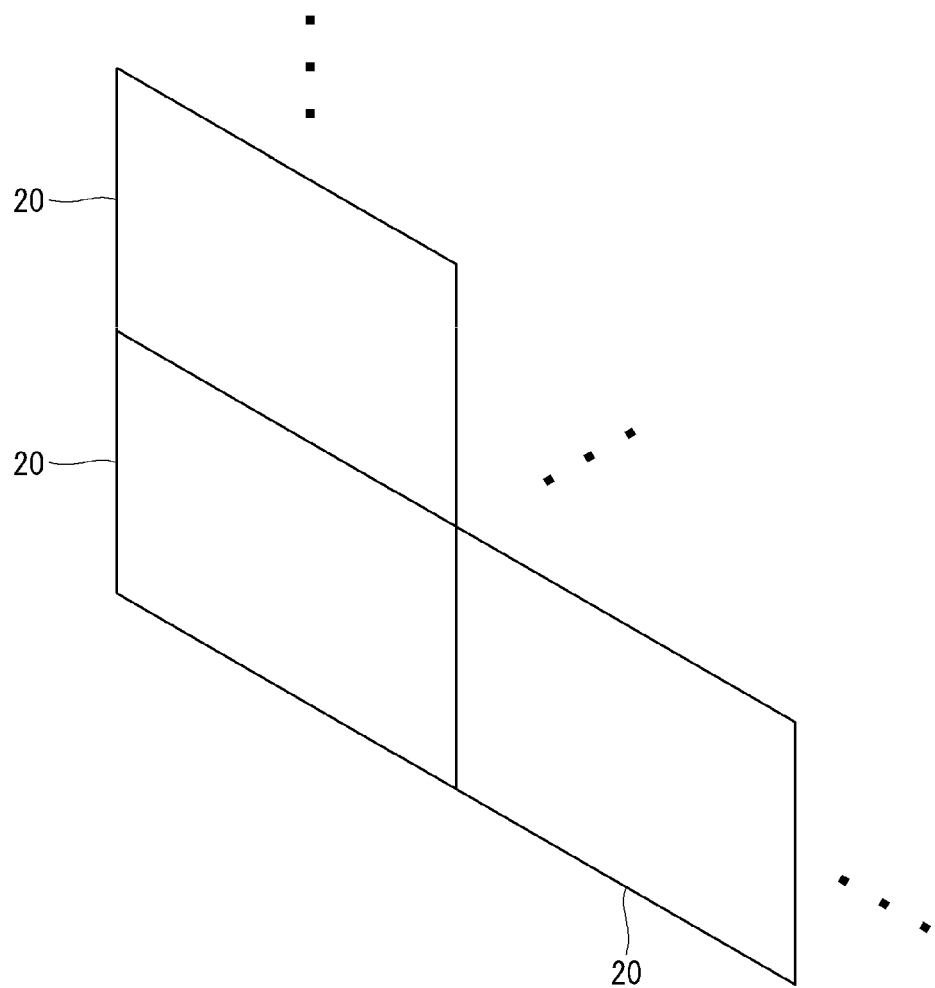

Referring to FIG. 3, the display device 20 may be implemented as a plurality of display devices electrically or physically connected to one another. The plurality of display devices 20 may also be interlocked with one another. Further, each display device 20 can display one image or a portion of one image. In this instance, outputs of the display devices 20 may be different from one another in color temperature, brightness, contrast, color, tone, etc. Thus, an output of each display device 20 needs to be adjusted in order to implement the same color, brightness, contrast, etc. Alternatively, outputs of pixels included in one display device 20 may be different from one another in color temperature, brightness, contrast, color, tone, etc. Thus, an output of each pixel needs to be adjusted in order to implement the same color, brightness, contrast, etc.

Figure 4:
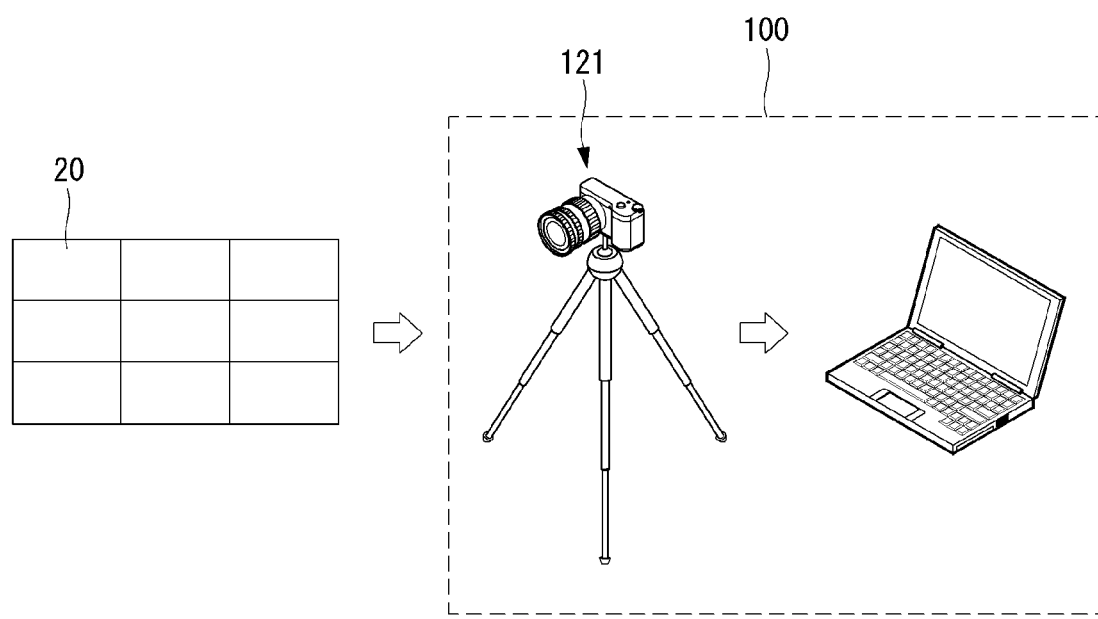
FIG. 4 illustrates a control system.

Referring to FIG. 4, the control device 100 can obtain output information of the display device 20. For example, the control device 100 can calculate information for adjusting an output of the display device 20 based on the output information of the display device 20, and control the display device 20 based on the calculated information.

Figure 5:
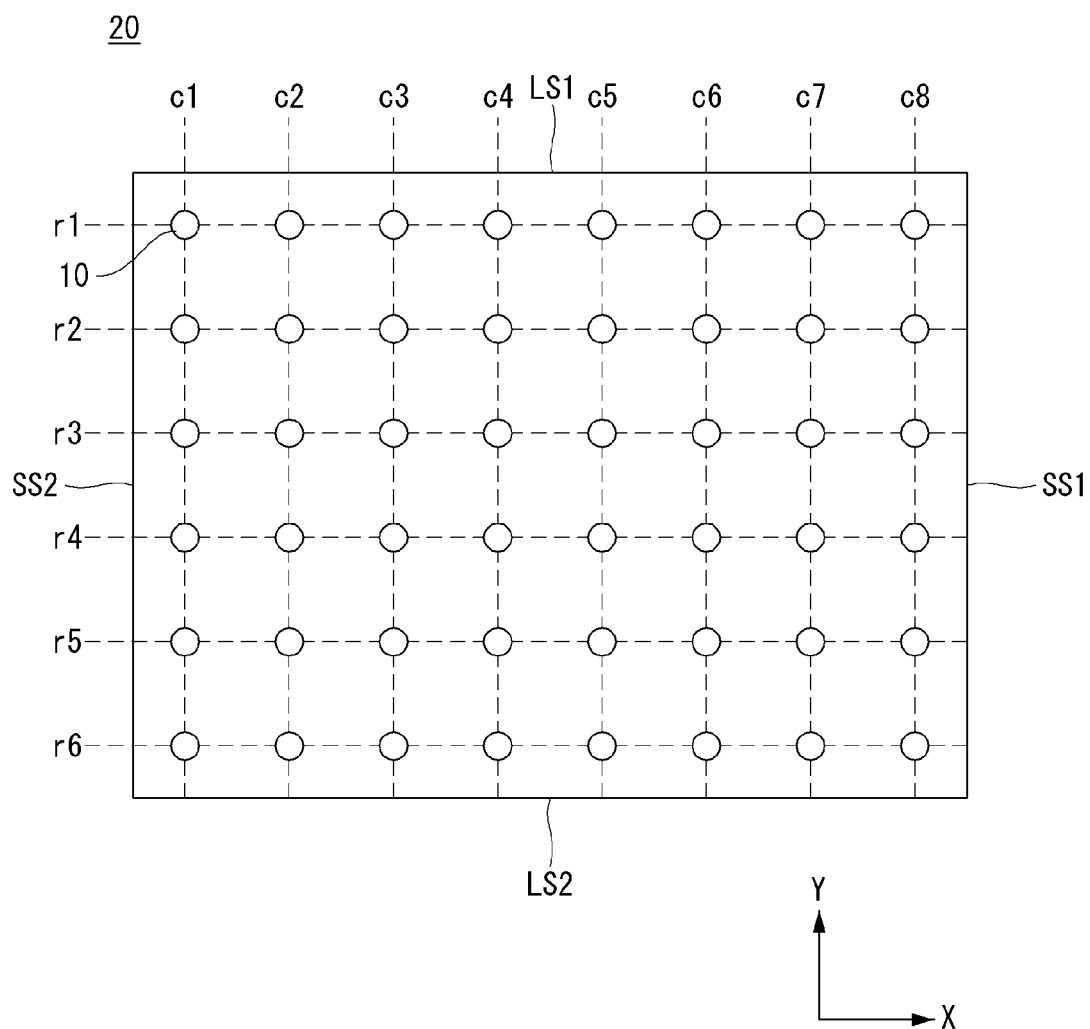

Referring to FIG. 5, a plurality of light source assemblies 10 may be installed in the display device 20. The light source assembly 10 can be referred to as a light source 10. Further, the light source assembly 10 may include a red light emitting diode (LED) chip, a green LED chip, and a blue LED chip. The LED chip may also be referred to as a pixel, a LED package, or a package. The plurality of light source assemblies 10 also form rows and/or columns.

In the example in FIG. 5, the plurality of light source assemblies 10 forming a row are spaced from one another and arranged at equal intervals. In addition, the plurality of light source assemblies 10 form a plurality of rows r1, r2, r3, r4, r5 and r6 disposed along one side of the display device 20. Further, the rows r1, r2, r3, r4, r5 and r6 are spaced from one another and arranged at equal intervals.

In addition, the plurality of light source assemblies 10 forming a column are spaced from one another and arranged at equal intervals. The plurality of light source assemblies 10 also form a plurality of columns c1, c2, c3, c4, c5, c6, c7 and c8 disposed along one side of the display device 20. Further, the columns c1, c2, c3, c4, c5, c6, c7 and c8 are spaced from one another and arranged at equal intervals. FIG. 5 illustrates the display device 20 including six rows and eight columns, by way of example. However, more or fewer rows and columns may be used.

Figure 6:
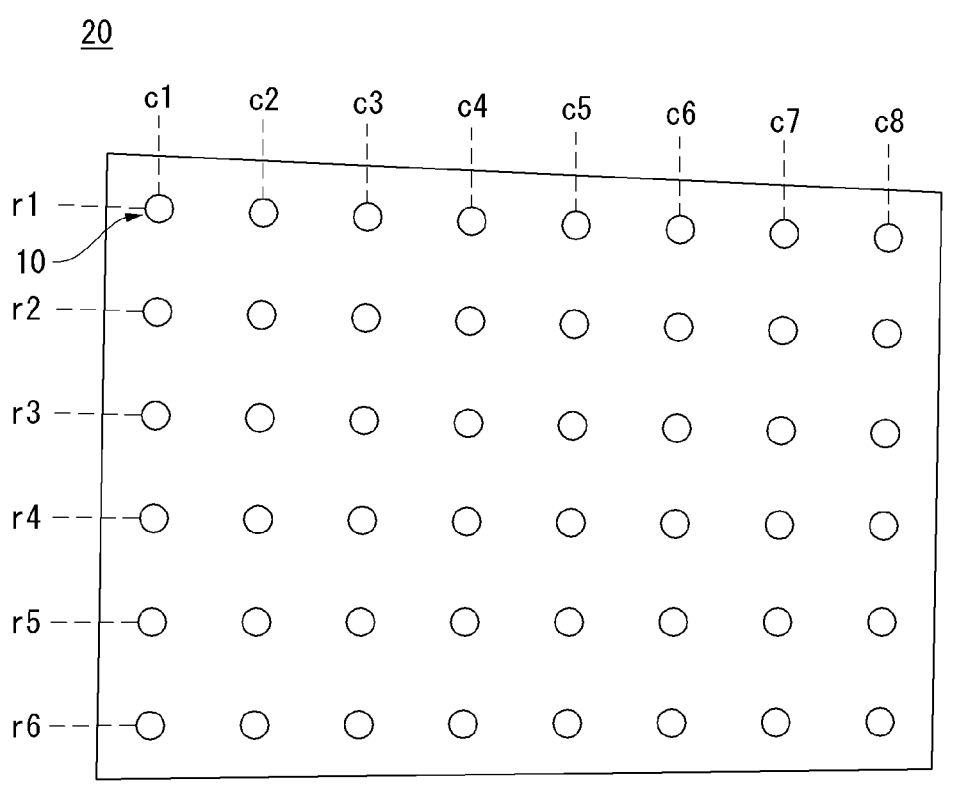

Referring to FIG. 6, in a process for installing the display device 20, a wavelength, a luminance, etc. of the display device 20 or the light source assembly 10 can be adjusted. In this instance, because the display device 20 or the light source assembly 10 is not adjusted as part of a production process of the display device 20, the display device 20 can be photographed using not a professional camera but a general camera. The camera 121 may be a general camera or a DSLR camera.

Further, it may not be easy for the camera 121 to be positioned facing the front of the display device 20 in the forward direction. Thus, it may be difficult to photograph the display device 20 in the forward direction. Further, the photographed display device 20 may not have a square or rectangular shape but a quadrilateral shape. The photographing of the display device 20 may also be performed in a dark environment or in a darkroom.

Figure 7:
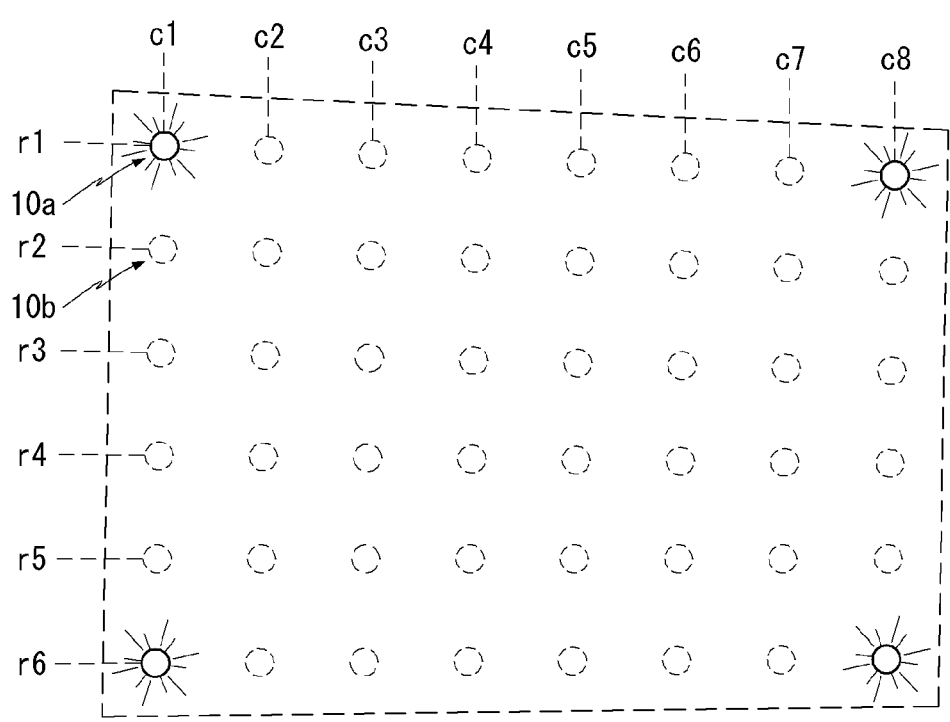

Referring to FIG. 7, in order to photograph the display device 20, the controller 180 can activate light source assemblies 10a positioned in corner areas CR1, CR2, CR3 and CR4 of the display device 20 or light source assemblies 10a positioned at vertices of the display device 20 and deactivate remaining light source assemblies 10b. When the display device 20 is photographed with the camera 121, only the activated light source assemblies 10a can be photographed, and the deactivated light source assemblies 10b or a boundary of the display device 20 are not photographed.

In addition, the controller 180 can grasp overall location information of the light source assembly 10 by recognizing the light source assemblies 10a positioned in the corner areas CR1, CR2, CR3 and CR4 of the display device 20 or the light source assemblies 10a positioned at the vertices of the display device 20. The control device 100 can also activate the specific light source assembly 10 and calculate which row and column the activated light source assembly 10 is positioned in based on location information of the activated light source assembly 10.

Figure 8:
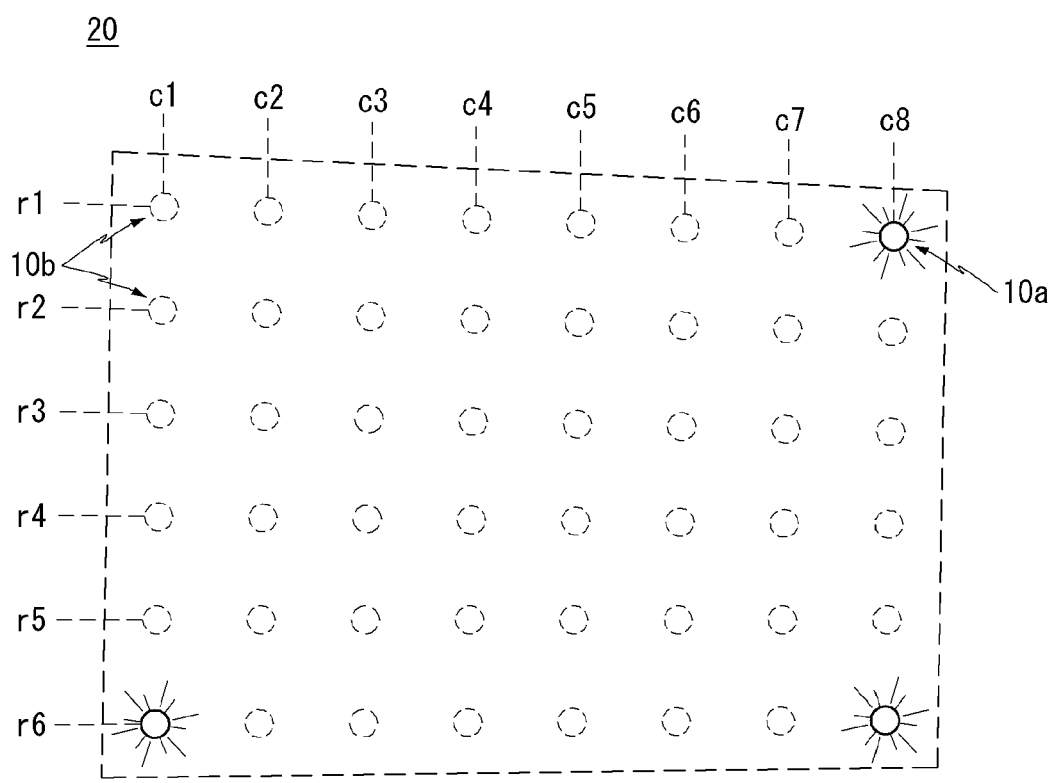

Referring to FIG. 8, some of the light source assemblies 10a positioned in the corner areas CR1, CR2, CR3 and CR4 of the display device 20 or the light source assemblies 10a positioned at the vertices of the display device 20 may not be activated due to a defect, a damage, a failure, or the like. Thus, the controller 180 may not recognize all the light source assemblies 10a positioned in the corner areas CR1, CR2, CR3 and CR4 of the display device 20 or all the light source assemblies 10a positioned at the vertices of the display device 20 and may not grasp overall location information of the light source assembly 10. Further, because the photographed display device 20 may not have a square or rectangular shape but a quadrilateral shape, the controller 180 may not grasp location information of the light source assembly 10.

Figure 9:
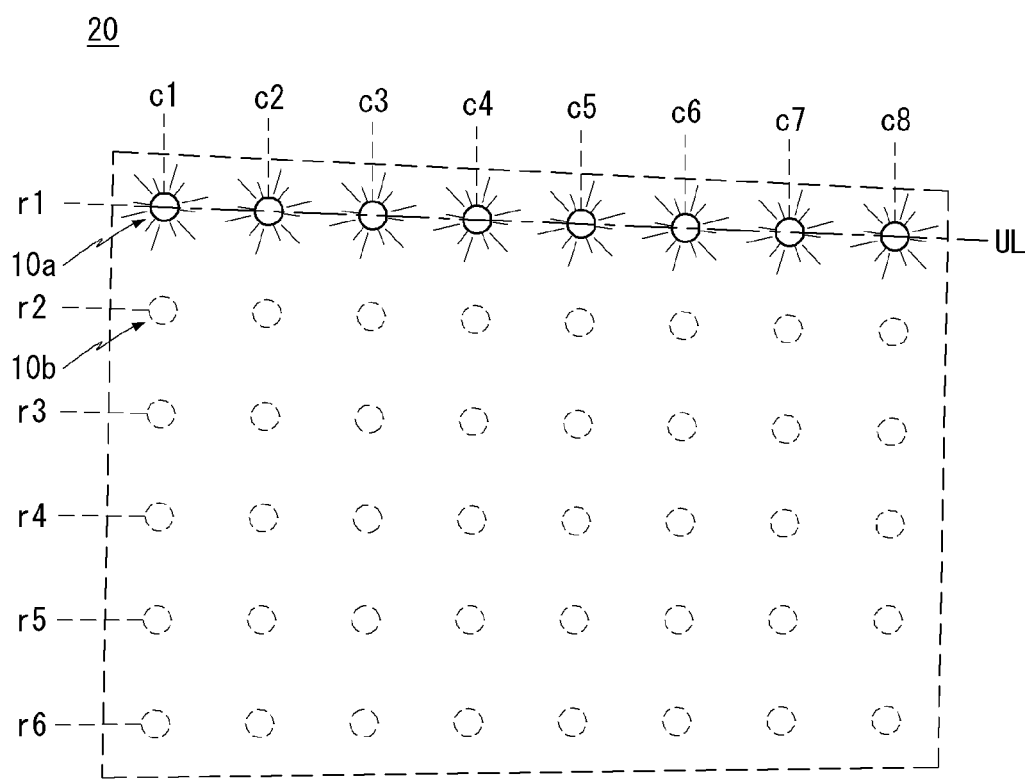

Referring to FIG. 9, the controller 180 can activate light source assemblies 10a of a first row r1, and the camera 121 can photograph the light source assemblies 10a of the first row r1. The controller 180 can also obtain a straight line UL or an equation UL of a straight line connecting the light source assemblies 10a of the first row r1 from an image photographed by the camera 121. If a location of the activated light source assemblies 10a is not accurately specified due to an error of a lens of the camera 121 or the like, the controller 180 can calculate that the light source assemblies 10a are positioned in a brightest portion. In addition, the memory 170 can store a method of calculating the straight line UL or the equation UL of the straight line.

Figure 10:
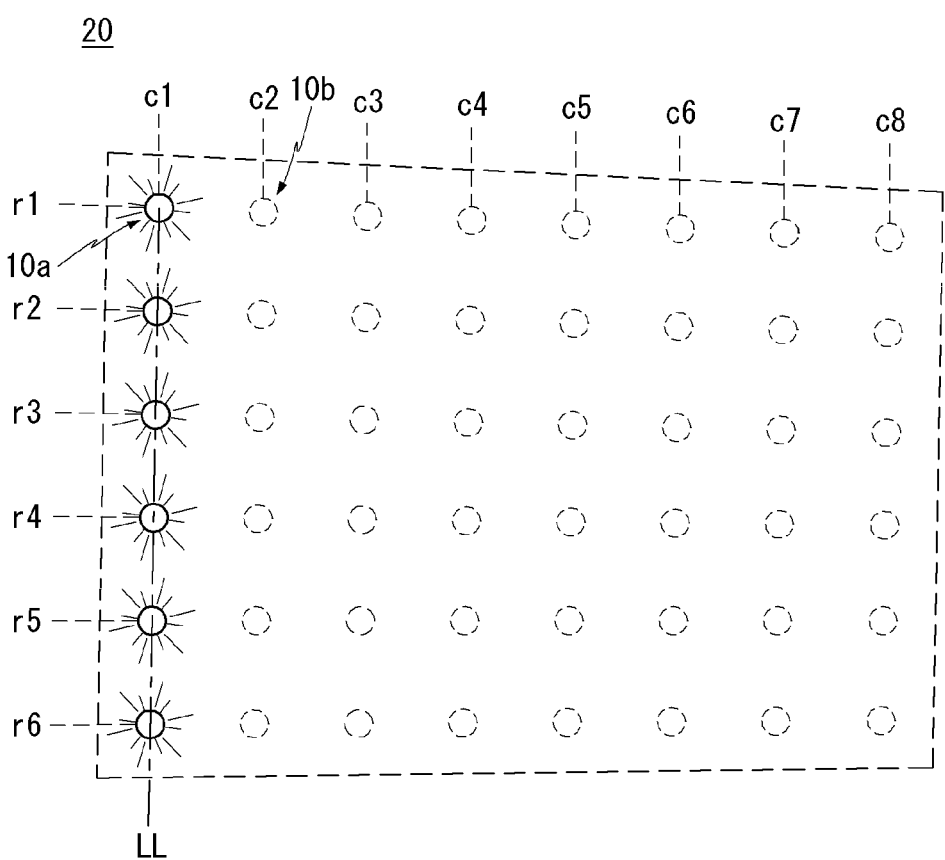

Referring to FIG. 10, the controller 180 can activate light source assemblies 10a of a first column c1, and the camera 121 can photograph the light source assemblies 10a of the first column c1. The controller 180 can obtain a straight line LL or an equation LL of a straight line connecting the light source assemblies 10a of the first column c1 from an image photographed by the camera 121. If a location of the activated light source assemblies 10a is not accurately specified due to an error of the lens of the camera 121 or the like, the controller 180 can calculate that the light source assemblies 10a are positioned in a brightest portion. The memory 170 can also store a method of calculating the straight line LL or the equation LL of the straight line.

Figure 11:
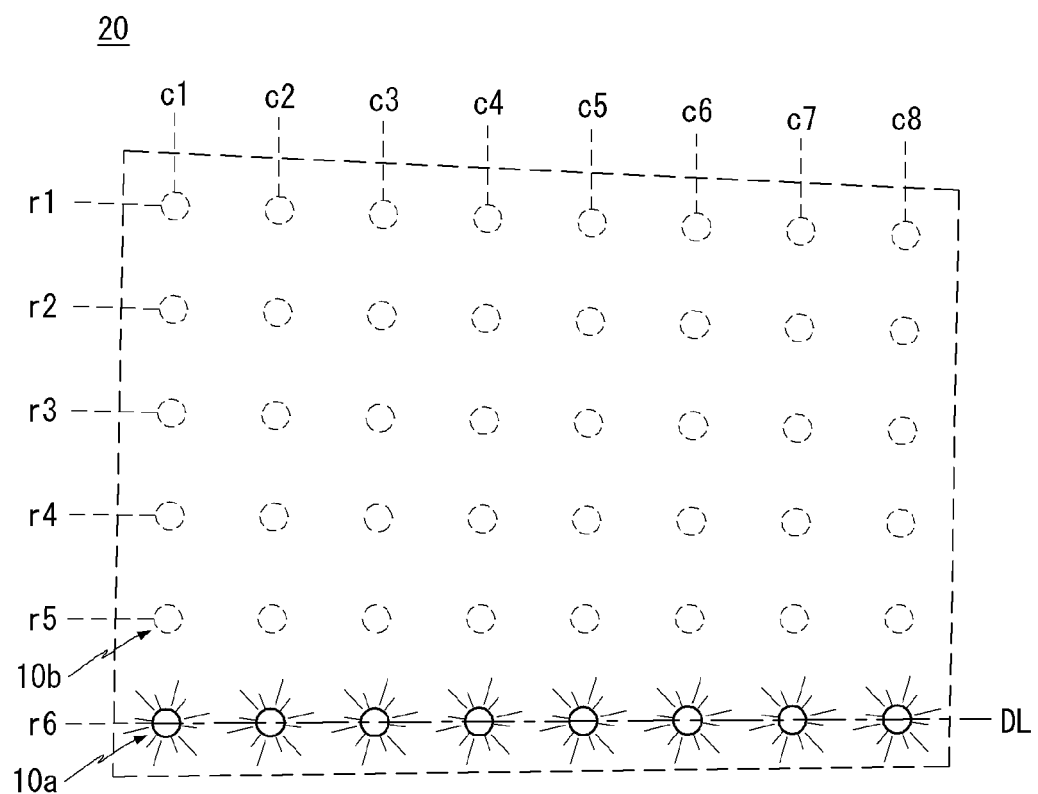

Referring to FIG. 11, the controller 180 can activate light source assemblies 10a of a sixth row r6, and the camera 121 can photograph the light source assemblies 10a of the sixth row r6. The controller 180 can use an image photographed by the camera 121 and obtain a straight line DL or an equation DL of a straight line connecting the light source assemblies 10a of the sixth row r6. If a location of the activated light source assemblies 10a is not accurately specified due to an error of the lens of the camera 121 or the like, the controller 180 can calculate that the light source assemblies 10a are positioned in a brightest portion. In addition, the memory 170 can store a method of calculating the straight line DL or the equation DL of the straight line.

Figure 12:
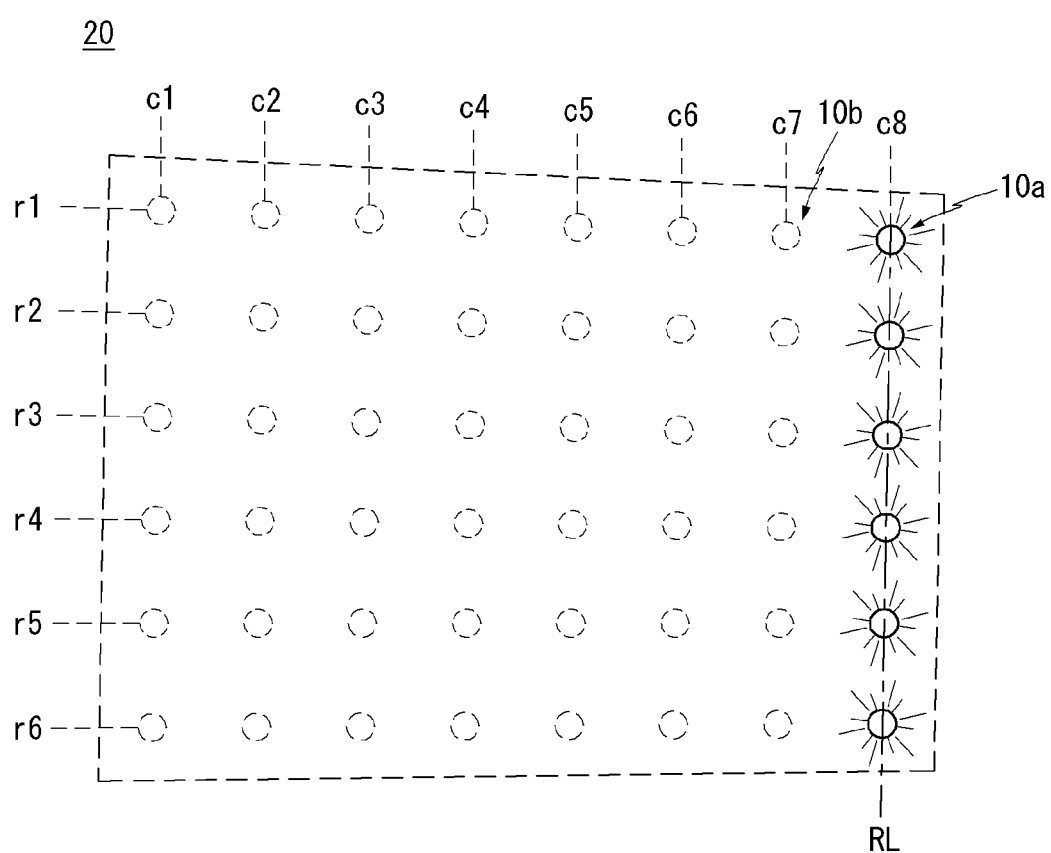

Referring to FIG. 12, the controller 180 can activate light source assemblies 10a of an eighth column c8, and the camera 121 can photograph the light source assemblies 10a of the eighth column c8. The controller 180 can use an image photographed by the camera 121 and obtain a straight line RL or an equation RL of a straight line connecting the light source assemblies 10a of the eighth column c8. If a location of the activated light source assemblies 10a is not accurately specified due to an error of the lens of the camera 121 or the like, the controller 180 can calculate that the light source assemblies 10a are positioned in a brightest portion. The memory 170 can store a method of calculating the straight line RL or the equation RL of the straight line.

Figure 13:
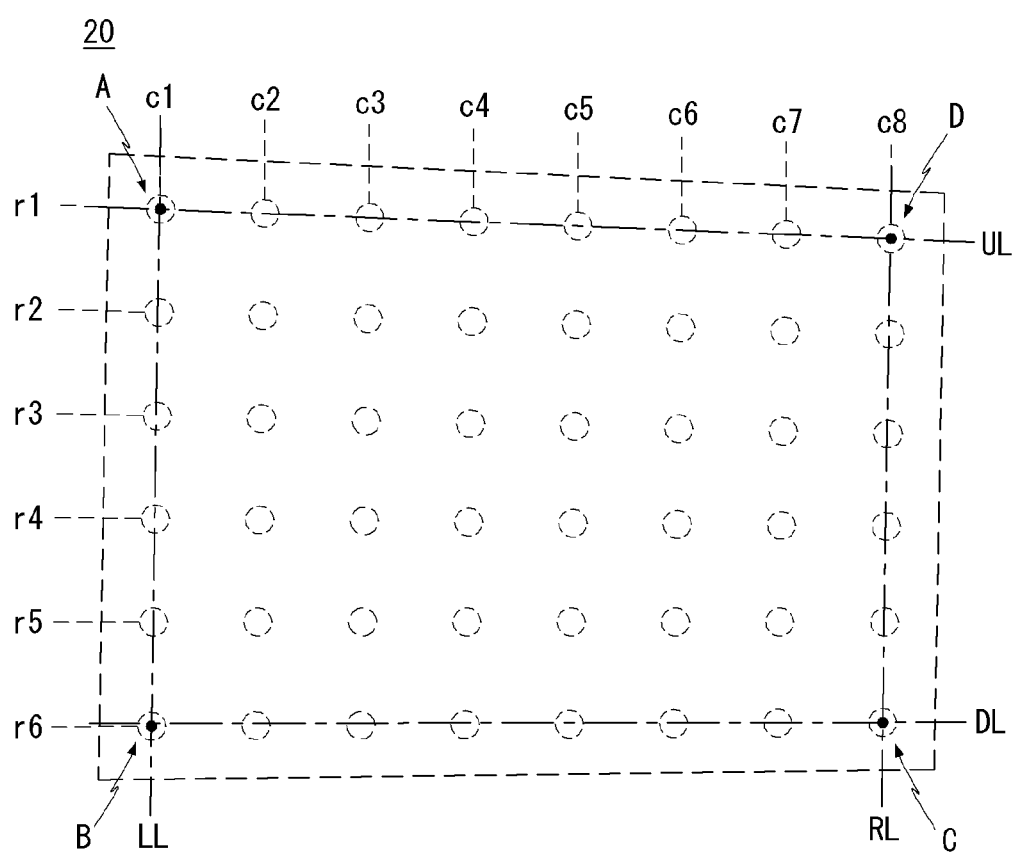

Referring to FIG. 13, the controller 180 can calculate vertices A, B, C and D where the straight lines UL, LL, DL and RL obtained by recognizing the light source assemblies 10a intersect. The controller 180 can also recognize that the light source assemblies 10a are positioned at the vertices A, B, C and D. The controller 180 can then obtain overall location information of the light source assembly 10 based on the vertices A, B, C and D where the straight lines UL, LL, DL and RL intersect. Further, the memory 170 can store a method of calculating intersecting points of the straight lines UL, LL, DL and RL.

Figure 14:
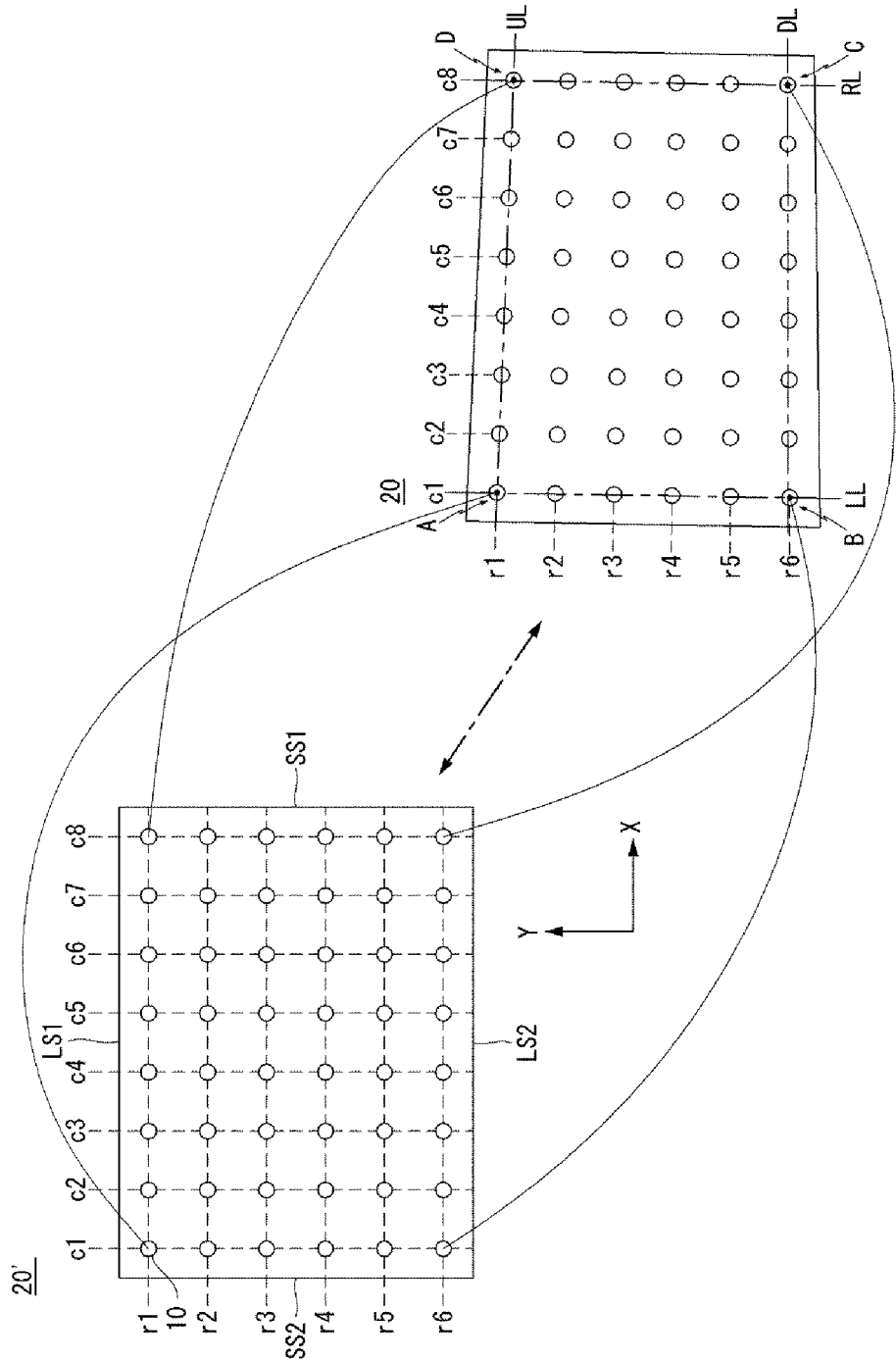

Referring to FIG. 14, an image of a display device 20' may be an image photographed in the forward direction by the camera 121. In addition, the memory 170 can store the image of the display device 20' and cause the image of the display device 20 to correspond to the image of the display device 20'. For example, the controller 180 can cause light source assemblies 10 positioned in the image of the display device 20 to respectively correspond to light source assemblies 10 positioned in the image of the display device 20'. Namely, a light source assembly 10 positioned at the vertex A may correspond to a light source assembly 10 positioned on the first row r1 and the first column c1, a light source assembly 10 positioned at the vertex B may correspond to a light source assembly 10 positioned on the sixth row r6 and the first column c1, a light source assembly 10 positioned at the vertex D may correspond to a light source assembly 10 positioned on the first row r1 and the eighth column c8, and a light source assembly 10 positioned at the vertex C may correspond to a light source assembly 10 positioned on the sixth row r6 and the eighth column c8. The controller 180 can cause remaining light source assemblies 10, that are not positioned at the vertices A, B, C and D, to respectively correspond to light source assemblies 10 of the image of the display device 20'.

The controller 180 can convert an image of the display device 20 photographed by the camera 121 into an image having the same type and scale as an image of the display device 20' and then cause the image of the display device 20 to correspond to the image of the display device 20'. Alternatively, the controller 180 can convert an image of the display device 20' stored in the memory 170 into an image having the same type and scale as an image of the display device 20 photographed by the camera 121 and then cause the image of the display device 20' to correspond to the image of the display device 20. When the image of the display device 20 photographed by the camera 121 is converted, the quality of the image may be damaged in a conversion process. Thus, it is preferable to convert the image of the display device 20' stored in the memory 170 into an image having the same type and scale as the image of the display device 20 photographed by the camera 121.

Figure 15:
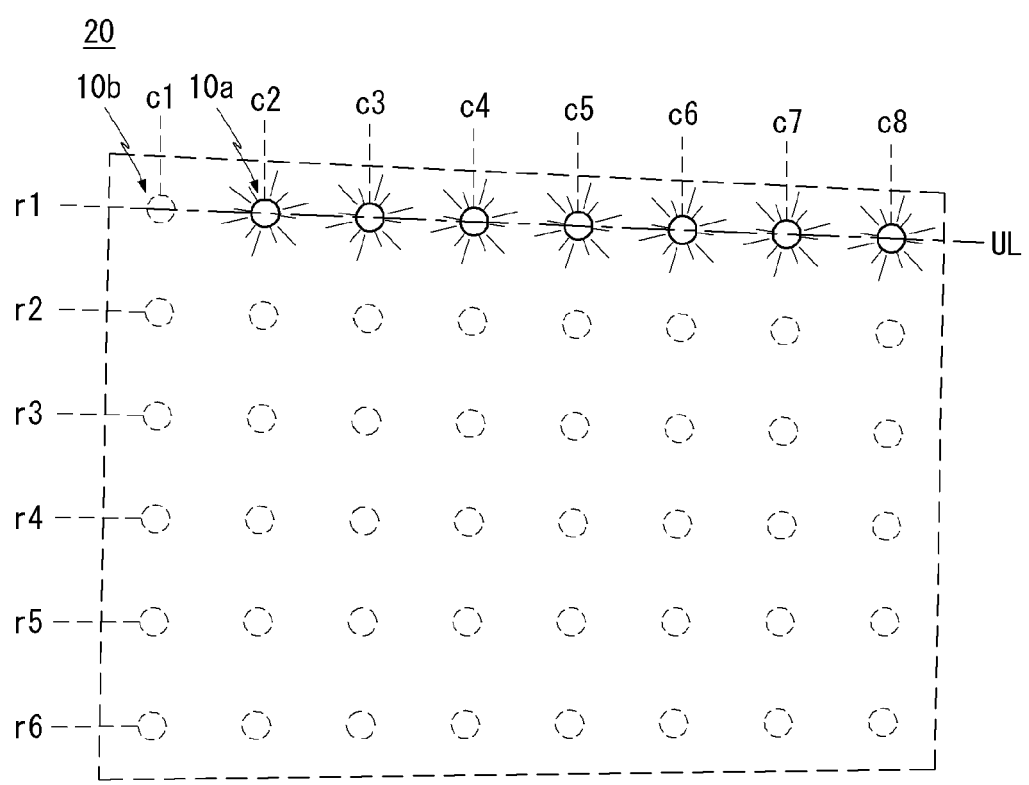
Figure 16:
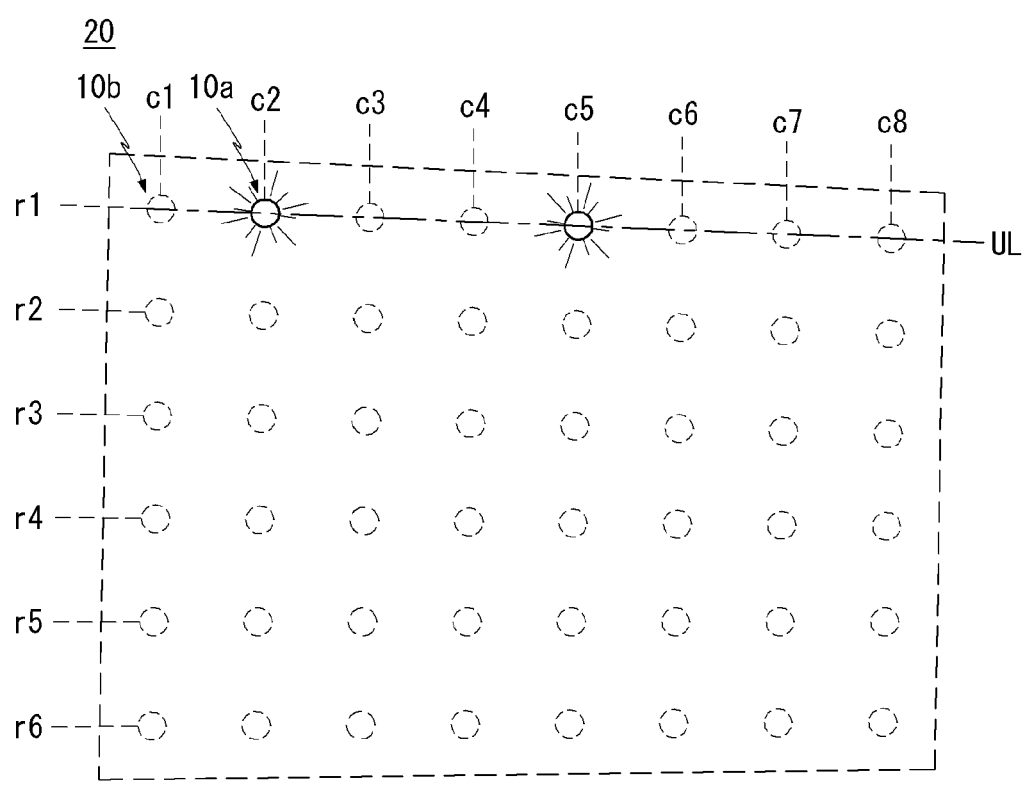

Referring to FIGS. 15 and 16, the controller 180 can activate light source assemblies 10 of the first row r1. However, a light source assembly 10b positioned on the first row r1 and the first column c1 among the light source assemblies 10 of the first row r1 may not be activated due to a defect, a damage, a failure, or the like. Alternatively, only two light source assemblies 10a among the light source assemblies 10 of the first row r1 may be activated, and remaining light source assemblies 10b may not be activated due to a defect, a damage, a failure, or the like. However, if two or more light source assemblies 10a among the light source assemblies 10 of the first row r1 are activated, the controller 180 can obtain a straight line UL or an equation UL of a straight line connecting the activated light source assemblies 10a.

Figure 17:
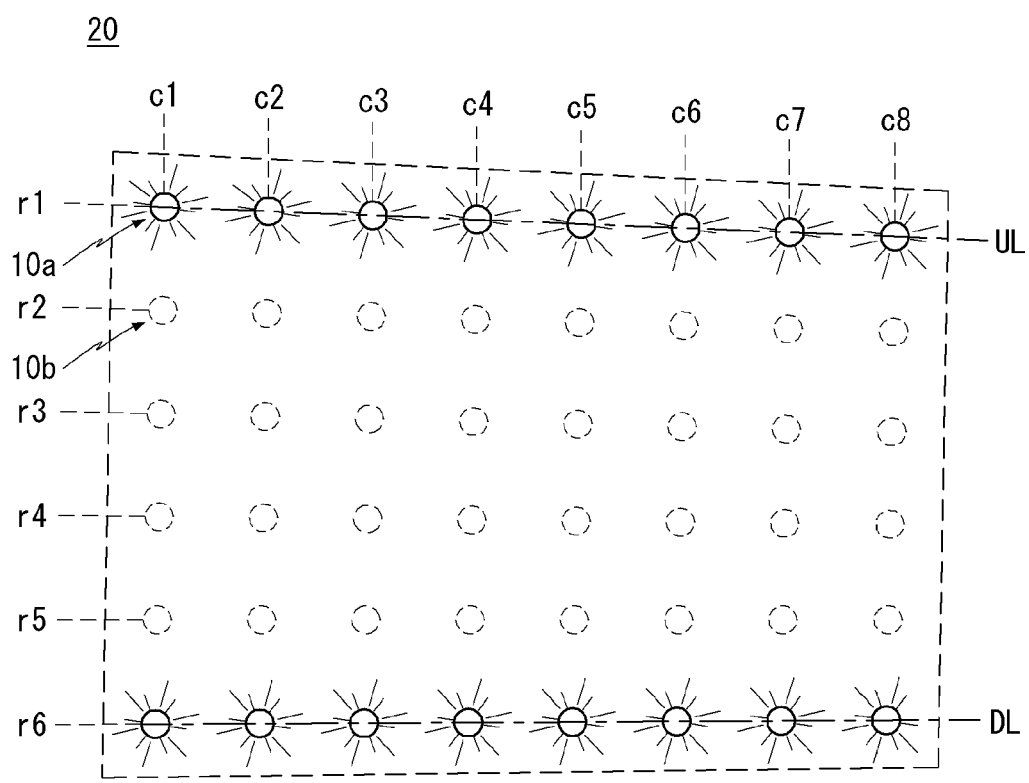

Referring to FIG. 17, the controller 180 can activate light source assemblies 10 of the first row r1 and light source assemblies 10 of the sixth row r6. The camera 121 can obtain the activated light source assemblies 10 of the first row r1 and the activated light source assemblies 10 of the sixth row r6 as one image. The controller 180 can then obtain two straight lines UL and DL or two equations UL and DL of straight lines from the one image.

Figure 18:
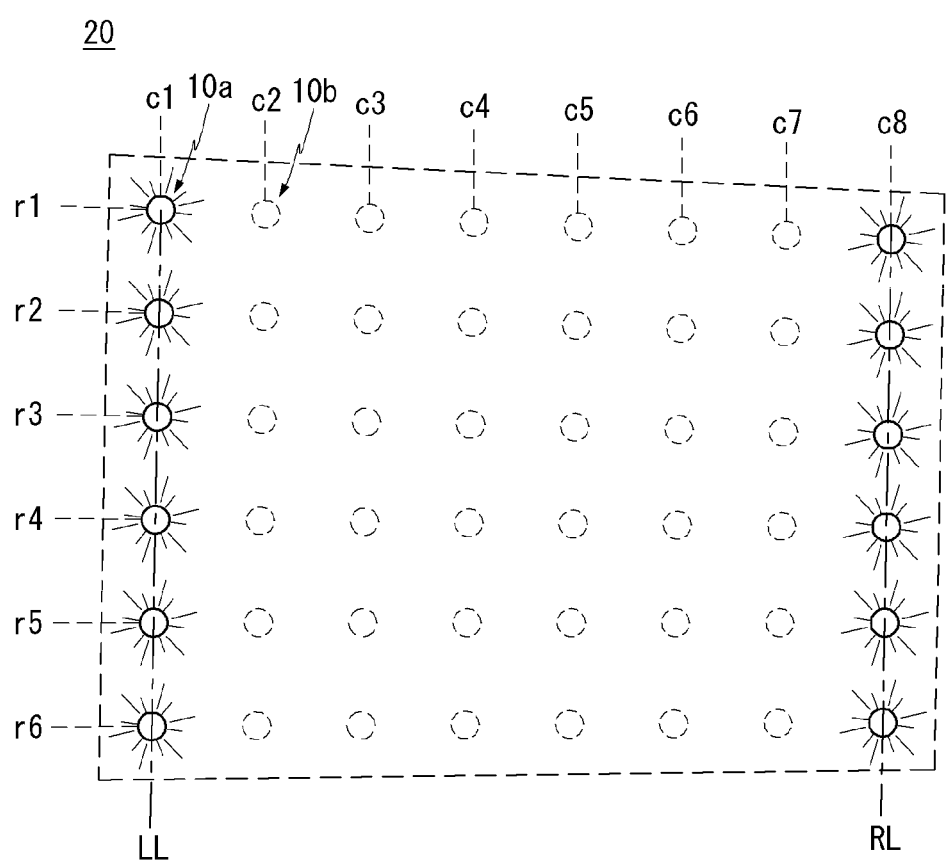

Referring to FIG. 18, the controller 180 can activate light source assemblies 10 of the first column c1 and light source assemblies 10 of the eighth column c8. The camera 121 can obtain the activated light source assemblies 10 of the first column c1 and the activated light source assemblies 10 of the eighth column c8 as one image. The controller 180 can obtain two straight lines LL and RL or two equations LL and RL of straight lines from the one image.

Figure 19:
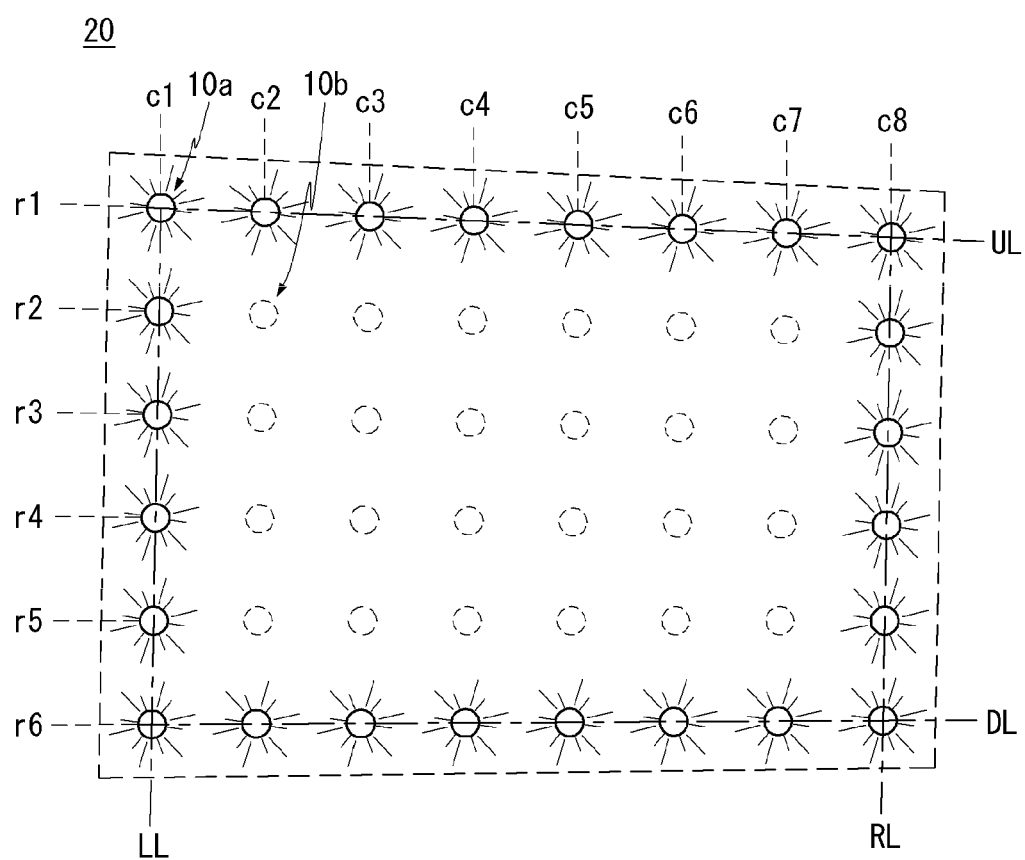

Referring to FIG. 19, the controller 180 can activate light source assemblies 10 of the first row r1, light source assemblies 10 of the sixth row r6, light source assemblies 10 of the first column c1, and light source assemblies 10 of the eighth column c8. The camera 121 can then obtain the activated light source assemblies 10 of the first row r1, the activated light source assemblies 10 of the sixth row r6, the activated light source assemblies 10 of the first column c1, and the activated light source assemblies 10 of the eighth column c8 as one image. The controller 180 can also obtain four straight lines UL, LL, DL and RL or four equations of straight lines UL, LL, DL and RL from the one image and calculate vertices A, B, C and D where the straight lines UL, LL, DL and RL intersect.

The controller 180 can obtain location information of the light source assembly 10 and then control brightness, color temperature, wavelength, etc. of each pixel. The controller 180 can not obtain an absolute value of a luminance or a color temperature through an image photographed by the camera 121 because of characteristics of a lens of a general camera. However, the controller 180 can measure a ratio of R (red), G (green) and B (blue) of each pixel through the image photographed by the camera 121.

Thus, the controller 180 can control the luminance or the color temperature of each pixel by adjusting an output ratio of R, G and B of each pixel. In this instance, R, G and B information, that are reference, can be stored in the memory 170. The R, G and B information of the reference may be precise values measured in a production process of the display device 20. Further, the controller 180 compares a reference value stored in the memory 170 with the image photographed by the camera 121 and can control the display device 20.

When the display device 20 is controlled in a place where the display device 20 is installed, it may be difficult to implement a complete darkroom. Even if the darkroom is implemented, the display device 20 may be affected by a light source around the darkroom. Thus, the controller 180 can deactivate all the light source assemblies 10 of the display device 20 and then obtain an image through the camera 121. The controller 180 can then measure brightness of the image and subtract a brightness of an image, that is photographed after deactivating all the light source assemblies 10, from a brightness of an image that is photographed after activating a specific light source assembly 10, thereby correcting the brightness of the image and obtaining more accurate brightness.

Figure 20:
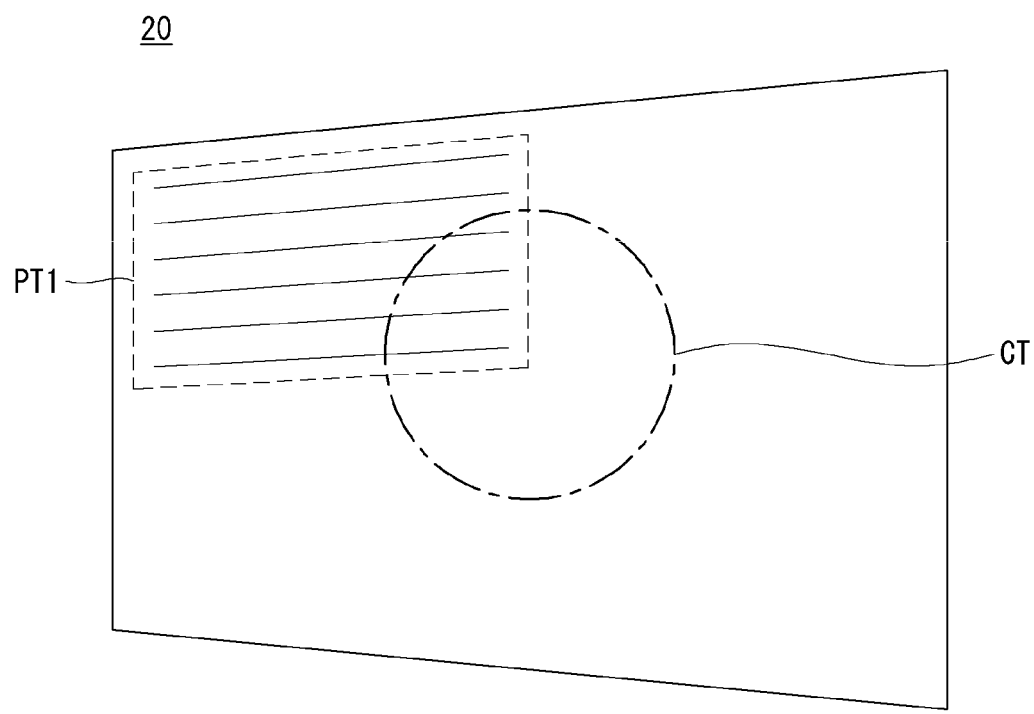
Figure 21:
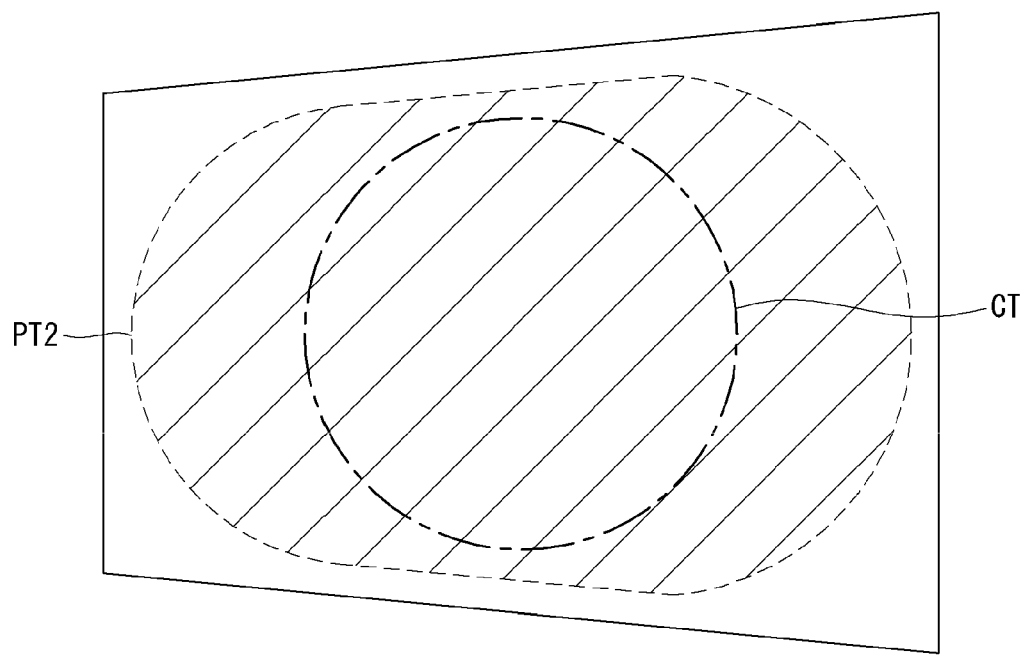

Referring to FIGS. 20 and 21, the camera 121 may be a DSLR camera detecting a phase difference or a contrast to focus. However, when the light source assemblies 10 of the display device 20 output the same brightness, the camera 121 it may be difficult to focus the camera. Thus, when the display device 20 outputs specific patterns PT1 and PT2, the camera 121 can focus. In addition, the patterns PT1 and PT2 may have any form including at least a portion of a central area CT of the display device 20, or entirely include the central area CT of the display device 20.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control device for controlling a display device including a plurality of light source assemblies arranged in rows and columns, the control device comprising:
   a camera configured to obtain at least one image of the display device including at least two activated light source assemblies in a first row and at least two activated light source assemblies in a first column;
   a controller configured to obtain a first intersecting point of a first straight line connecting the at least two light source assemblies of the first row and a second straight line connecting the at least two light source assemblies of the first column; and
   a display unit configured to display the first intersecting point,
   wherein the at least one image of the display device is an image in which at least one light source assembly positioned in the first row and the first column is deactivated.

2. The control device of claim 1, wherein the at least one deactivated light source assembly is positioned at the first intersecting point.

3. The control device of claim 1, wherein the camera obtains an image of the display device in which at least two light source assemblies of a last row are activated,
   wherein the controller obtains a second intersecting point of a third straight line connecting the at least two light source assemblies of the last row and the second straight line, and
   wherein the display unit displays the second intersecting point.

4. The control device of claim 3, wherein the image of the display device in which the at least two light source assemblies of the last row are activated is an image in which at least one light source assembly positioned in the last row and the first column is deactivated.

5. The control device of claim 4, wherein the camera obtains an image of the display device in which at least two light source assemblies of a last column are activated,
   wherein the controller obtains a third intersecting point of a fourth straight line connecting the at least two light source assemblies of the last column and the first straight line, and
   wherein the display unit displays the third intersecting point.

6. The control device of claim 5, wherein the image of the display device in which the at least two light source assemblies of the last column are activated is an image in which at least one light source assembly positioned in the first row and the last column is deactivated.

7. The control device of claim 6, wherein the camera obtains an image of the display device in which at least two light source assemblies of a last column are activated, wherein the controller obtains a fourth intersecting point of a fourth straight line connecting the at least two light source assemblies of the last column and the third straight line, and wherein the display unit displays the fourth intersecting point.

8. The control device of claim 7, wherein the image of the display device in which the at least two light source assemblies of the last column are activated is an image in which at least one light source assembly positioned in the last row and the last column is deactivated.

9. The control device of claim 7, wherein the first intersecting point, the second intersecting point, the third intersecting point and the fourth intersecting point comprise vertices of the display device.

10. The control device of claim 1, wherein the at least one image of the display device captured by the camera includes a first image of the least two activated light source assemblies in the first row and a second image of the at least two activated light source assemblies in the first column.

11. The control device of claim 1, wherein the controller is further configured to obtain a vertex of the display device having a deactivated light assembly positioned at the vertex based on the intersecting point.

12. A method of determining vertices of a display device including a plurality of light source assemblies arranged in rows and columns, the method comprising:

obtaining, via a camera, at least one image of the display device including at least two activated light source assemblies in a first row and at least two activated light source assemblies in a first column;

obtaining, via a controller, a first intersecting point of a first straight line connecting the at least two light source assemblies of the first row and a second straight line connecting the at least two light source assemblies of the first column; and displaying, via a display unit, the first intersecting point, wherein the at least one image of the display device is an image in which at least one light source assembly positioned in the first row and the first column is deactivated.

13. The method of claim 12, wherein the at least one deactivated light source assembly is positioned at the first intersecting point.

14. The method of claim 12, further comprising:

obtaining, via the camera, an image of the display device in which at least two light source assemblies of a last row are activated;

obtaining, via the controller, a second intersecting point of a third straight line connecting the at least two light source assemblies of the last row and the second straight line; and displaying, via the display unit, the second intersecting point.

15. The method of claim 14, wherein the image of the display device in which the at least two light source assemblies of the last row are activated is an image in which at least one light source assembly positioned in the last row and the first column is deactivated.

16. The method of claim 15, further comprising:

obtaining, via the camera, an image of the display device in which at least two light source assemblies of a last column are activated;

obtaining, via the controller, a third intersecting point of a fourth straight line connecting the at least two light source assemblies of the last column and the first straight line; and displaying, via the display unit, the third intersecting point.

17. The method of claim 16, wherein the image of the display device in which the at least two light source assemblies of the last column are activated is an image in which at least one light source assembly positioned in the first row and the last column is deactivated.

18. The method of claim 17, further comprising:

obtaining, via the camera, an image of the display device in which at least two light source assemblies of a last column are activated;

obtaining, via the controller, a fourth intersecting point of a fourth straight line connecting the at least two light source assemblies of the last column and the third straight line; and displaying, via the display unit, the fourth intersecting point.

19. The method of claim 18, wherein the image of the display device in which the at least two light source assemblies of the last column are activated is an image in which at least one light source assembly positioned in the last row and the last column is deactivated.

20. The method of claim 19, wherein the first intersecting point, the second intersecting point, the third intersecting point and the fourth intersecting point comprise vertices of the display device.

* * * * *